(No Model.) 2 Sheets—Sheet 1.
W. L. KING.
UNDERGROUND ELECTRIC POWER SYSTEM FOR RAILWAYS.
No. 572,013. Patented Nov. 24, 1896.
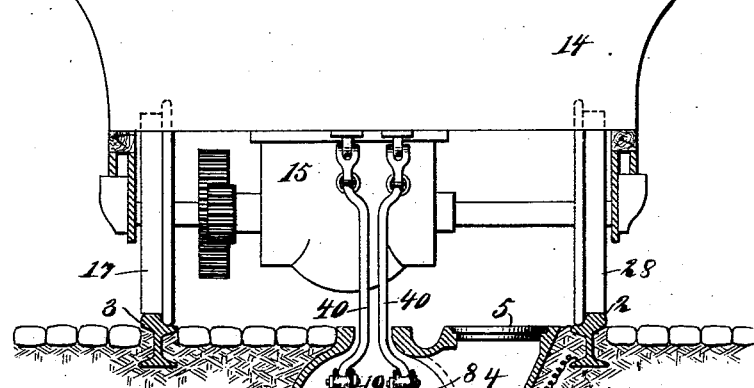
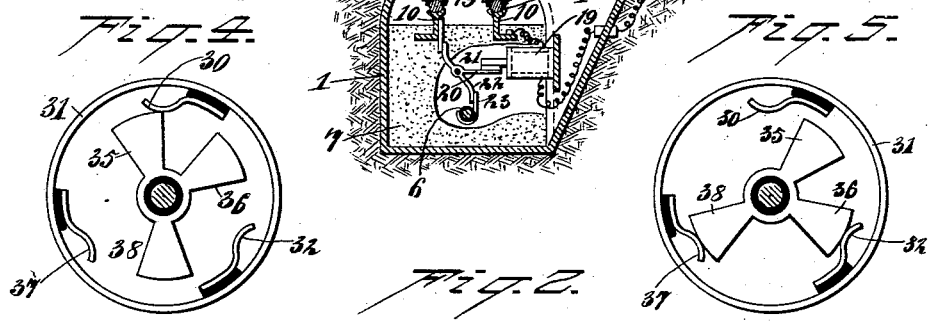
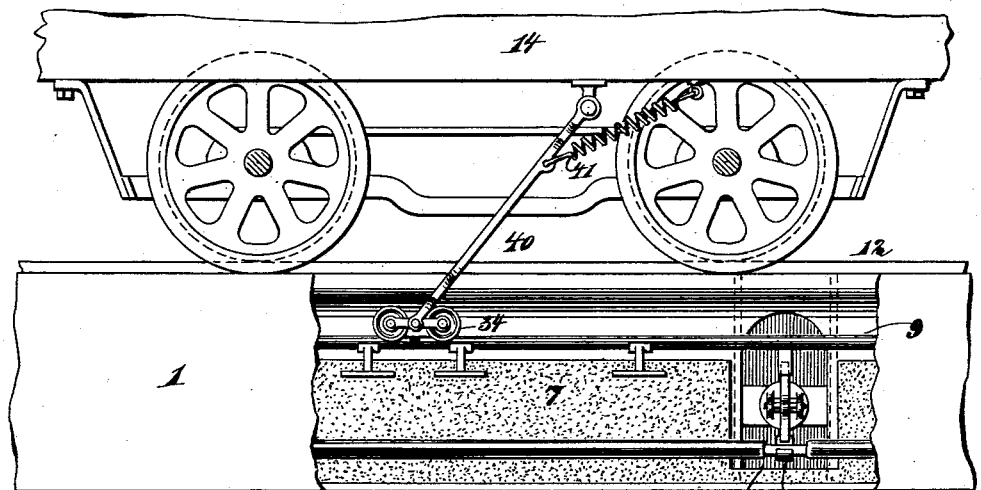
WITNESSES:
Henry T. Hirsch
C. R. Ferguson
INVENTOR
W. L. King
BY
ATTORNEYS.

(No Model.)
W. L. KING.
UNDERGROUND ELECTRIC POWER SYSTEM FOR RAILWAYS.
No. 572,013.
2 Sheets—Sheet 2.
Patented Nov. 24, 1896.
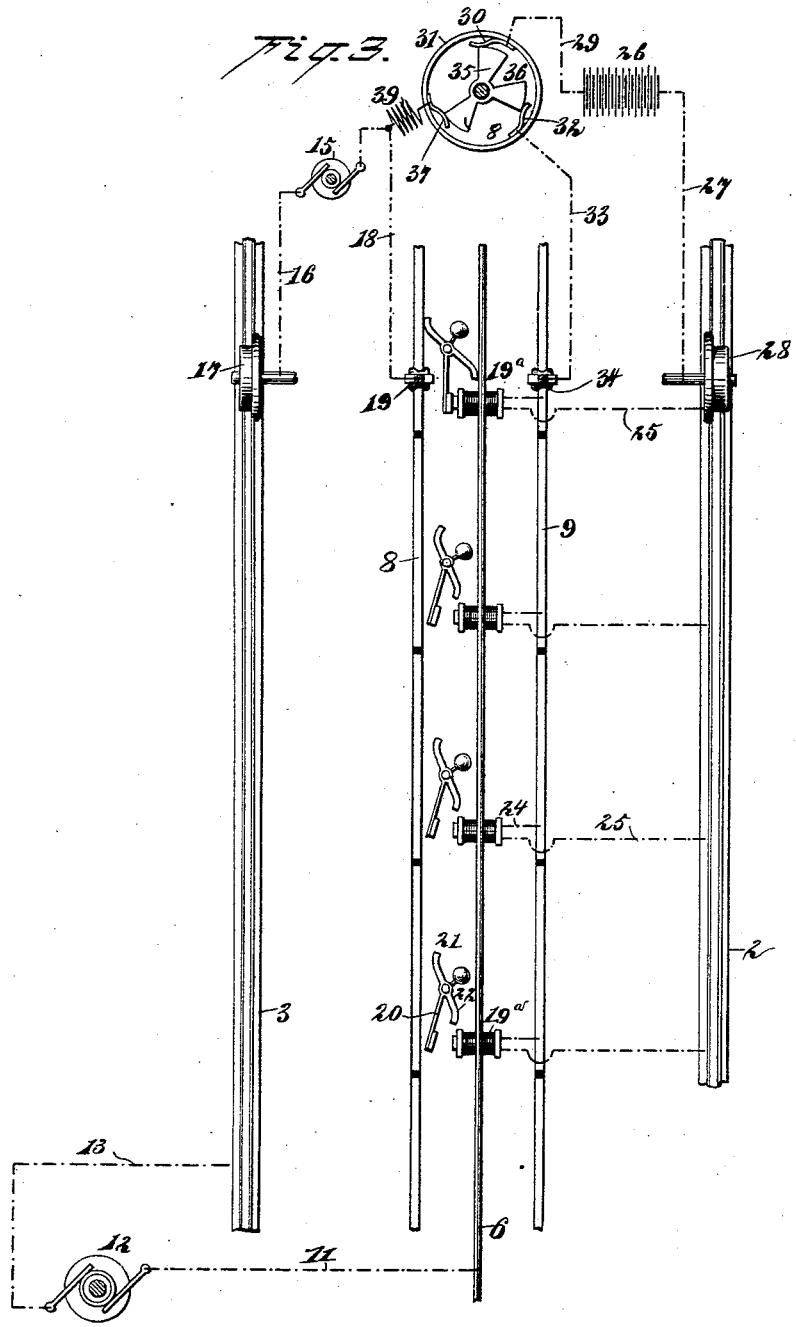
WITNESSES:
INVENTOR
W. L. King
BY
ATTORNEYS.

UNITED STATES PATENT OFFICE.

WILLIAM L. KING, OF WINSTON, NORTH CAROLINA.

UNDERGROUND ELECTRIC POWER SYSTEM FOR RAILWAYS.

SPECIFICATION forming part of Letters Patent No. 572,013, dated November 24, 1896.

Application filed May 21, 1896. Serial No. 592,408. (No model.)

*To all whom it may concern:*

Be it known that I, WILLIAM L. KING, of Winston, in the county of Forsyth and State of North Carolina, have invented new and useful Improvements in Underground Electric Power Systems for Railways, of which the following is a full, clear, and exact description.

This invention relates to railway systems in which the electric transmitting power is located in a conduit below the road-surface, and the object is to so construct the parts that the current-conveyers will be protected or so isolated that the danger of contact with persons is avoided. Therefore danger from this source is reduced to a minimum; and a further object is to so construct the parts that the electric current passing through the motor of a car is under the complete control of the motorman.

I will describe a system embodying my invention, and then point out the novel features of the invention in the appended claims.

Reference is to be had to the accompanying drawings, forming a part of this specification, in which similar characters of reference indicate corresponding parts in all the views.

Figure 1 is a partial elevation and partial section of a system embodying my invention. Fig. 2 is a side elevation thereof with parts broken away to more clearly show other parts. Fig. 3 is a diagrammatic view of the system. Fig. 4 is a plan view of a controlling-switch carried by a car, showing the same in one position; and Fig. 5 is a plan view thereof, showing the switch in another position.

The invention comprises the conduit 1, of suitable material, such, for instance, as iron, and having a longitudinal slot-opening at its upper side for the passage of trolley-poles, as will be hereinafter described. As here shown, this conduit is placed longitudinally between the tracks 2 3 and below the roadway. At suitable intervals it is provided with offset boxings 4, provided with covers 5. Within the conduit 1 is a main current-conveying wire 6, properly insulated and preferably embedded in a suitable cement 7, packed in the conduit.

Above the cement 7 within the conduit are arranged the main working conductors 8 and an auxiliary working conductor 9. These working conductors are respectively arranged in sections of suitable length insulated one from another at the ends. They are supported rigidly on arms 10 of metal, which are in electrical contact with the working-conductor sections. The main wire 6 is in electrical connection through a wire 11 with one pole of an electric generator 12, located in the power-house, and from the other pole of this generator a wire 13 extends to the track 3, said rack thus forming a conveyer for the return current.

It is to be understood that I may provide other means, such as a wire arranged between the tracks, for said return current; but in the event of using the track for such purpose it is obvious that the ends of the several rails must be electrically connected.

On the car 14 is an electric motor 15, having connection with the axle of a pair of wheels in the usual manner. From one pole of this motor 15 a wire 16 extends to a connection with the axle of a car, whereby the current may flow through the wheel 17 to the track 3. The other pole of the motor 15 is connected by a wire 18 with a trolley 19, engaging with the main working conductors 8.

I will now describe the means for directing the current from the main wire 6 to the working conductors 8. As here shown, this means consists of electric motors or electromagnets 19$^a$ and armature-levers 20, coacting therewith. The electromagnets and armature-levers are located within the conduit in the openings provided by the boxings 4, so that they may be easily reached for repairs when necessary. The pivoted armature-levers 20 carry oppositely-extending arms 21 22, adapted to engage, respectively, with a section of the working conductor 8 and the wire 6 or with a contact-finger 23, extended therefrom, as indicated in Fig. 1. There will be one electromagnet for each section of the trolley plate or wire 9, and with such section one pole of the electromagnet is connected by a wire 24, the other pole of the electromagnet being connected by a wire 25 with the rail or track 2.

Carried by the car is an electric generator 26. (Here shown in the form of a battery.) From one pole of this generator 26 a wire 27 leads through the car-wheel 28, through which the current passes to the track 2, and from the other pole of the generator a wire 29 leads to a connection with a spring-yielding contact-finger 30, arranged in a switch-box 31. Another spring contact-finger 32, arranged in the switch-box, has a connection 33 with an auxiliary trolley 34.

Within the switch-box 31 is arranged a circuit-closer adapted to be rotated by a motorman and comprising arms 35 36, adapted to be engaged, respectively, with the contact-fingers 30 32 to close the circuit through the generator 26. When a car is at a standstill, the circuit-closer will be in the position indicated in Fig. 4; but when it is desired to start the car the circuit-closer will be rotated to bring the arms 35 36 into engagement with the contact-fingers 30 32. Thus a local current will be closed through the generator 26, the wire 27, the wheel 28, the rail 2, wire 25, electromagnet 19, wire 24, a section of the working conductor 9, the trolley 34, the wire 33, and thence back to the generator. By energizing the electromagnet 19 the armature 20 will be attracted and cause the arms 21 22 to close the circuit between the wire 6 and the section of the working conductor 8, so that the live current may pass through the trolley 19, wire 18, the motor 15 on the car, and out through the track 3 to the generator at the powerhouse.

It may sometimes be desired to employ a portion of the main current for energizing the electromagnets 19 should any accident happen to the generator 26 on the car or it be desired to save its power. For this purpose I have shown a connection between the wire 18 and a spring-yielding contact-finger 37, located in the switch-box 31 and adapted to be engaged by an arm 38 of the circuit-closer. The connection between the wire 18 and the finger 37 contains a suitable resistance 39, so that but a small portion of the main current will be conveyed to the electromagnets. When the current is so conveyed, the circuit-closer will be in the position indicated in Fig. 5.

Each trolley 19 34 is preferably formed with two rollers, as indicated in Fig. 2, the two rollers being mounted on a bar having pivotal connection with a trolley pole or rod 40, extended upward through the opening in the conduit and having a swinging connection with the bottom of the car. The trolley pole or rod is held with a yielding downward pressure by means of a spring 41, secured at one end to the trolley-pole and at the other end to the body of the car. By employing two rollers, as shown and described, sparking and the possible burning out of the parts are prevented should the trolley meet with obstructions on its working conductor, such, for instance, as gravel, or in passing from one section to the other.

It is obvious that one of the merits of my invention is that it does away with the overhead-trolley system, which is so dangerous to man and beast. There is no exposure of current of electricity on any part of the trolley-rails or on any part of the track-rails excepting upon the section over which the car may be passing.

Having thus described my invention, I claim as new and desire to secure by Letters Patent—

1. An underground electric power system for railways, comprising a conduit, a main current-wire in said conduit, a main source of electricity with which the main wire connects, a return-circuit carrier having connection with said source of electricity, a sectional main working conductor in the conduit, an auxiliary working conductor in the conduit, a motor carried by a car and arranged in a circuit between the main working conductor and return-circuit carrier, a three-point switch carried by the car, a shunt-wire having a resistance connecting one of the switch-points with the circuit leading through the motor, an electric generator carried by the car and having one of its poles in connection with one of the switch-points and the other of its poles in connection with a track-rail, a connection between one of the switch-points and the auxiliary conductor, and a circuit-closer for closing a circuit between the main current-wire and the main working conductor, the said circuit-closer being operated from the generator carried by the car, or from a current derived from the main circuit, substantially as specified.

2. An underground electric power system for railways, comprising a main current-conductor, a working conductor, a motor carried by the car and arranged in a circuit leading from the main conductor, an electric generator carried by the car, a switch-box carried by the car, three yielding contact-fingers in said box, a shunt comprising a resistance connecting one of said points with the current leading through the motor, a connection between another of said points and a pole of the generator, a connection between the other of said points and an auxiliary working conductor, a three-armed circuit-closer in said box adapted to engage with a pair of said points, and means for closing the circuit from the main conductor through the motor, the said means being controlled by the circuit-closer in the switch-box, substantially as specified.

WILLIAM L. KING.

Witnesses:
J. F. HARRIS,
J. C. BESSENT.